3,027,318
PURIFICATION OF CRUDE COKE OVEN LIGHT OIL
Leonhard T. Hartmann, New York, N.Y., assignor to Allied Chemical Corporation, New York, N.Y., a corporation of New York
Filed Oct. 23, 1958, Ser. No. 769,230
7 Claims. (Cl. 208—224)

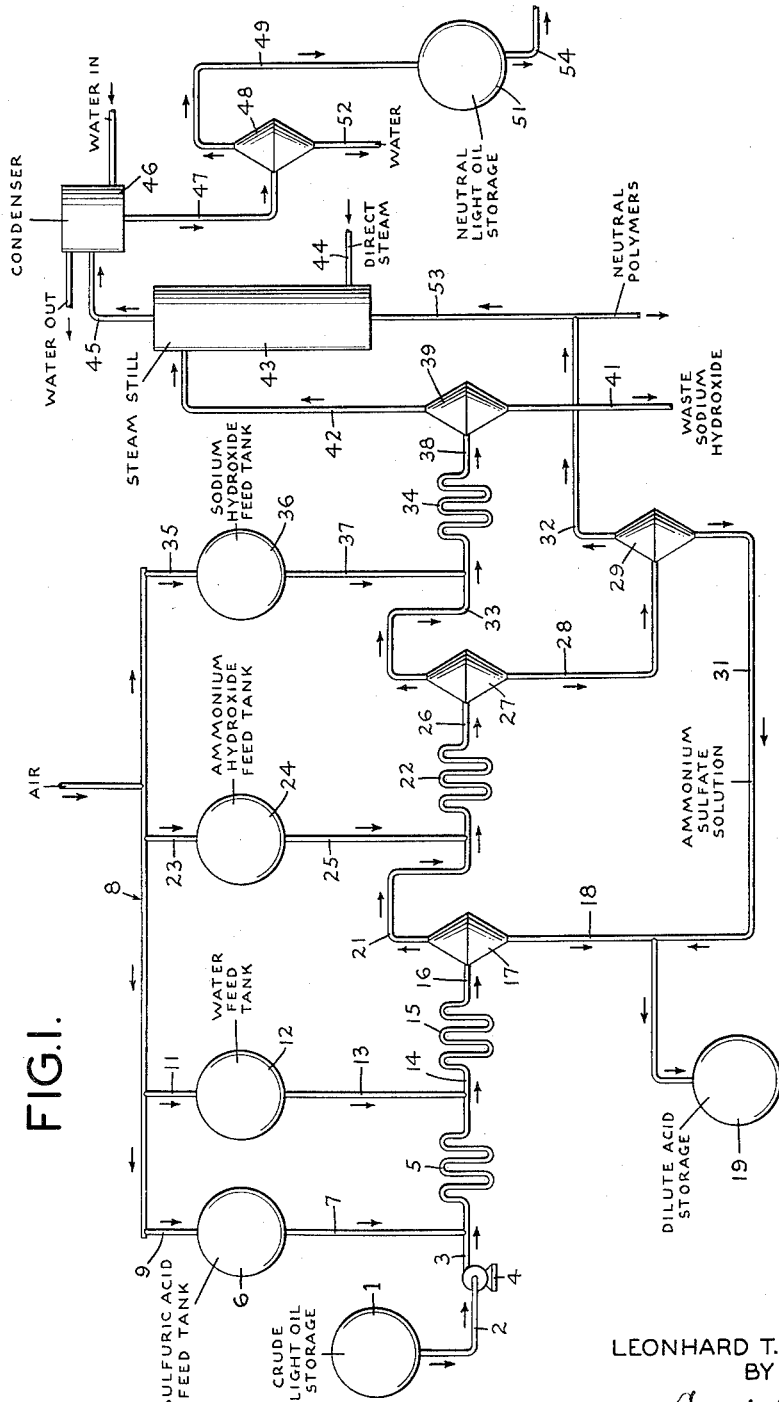

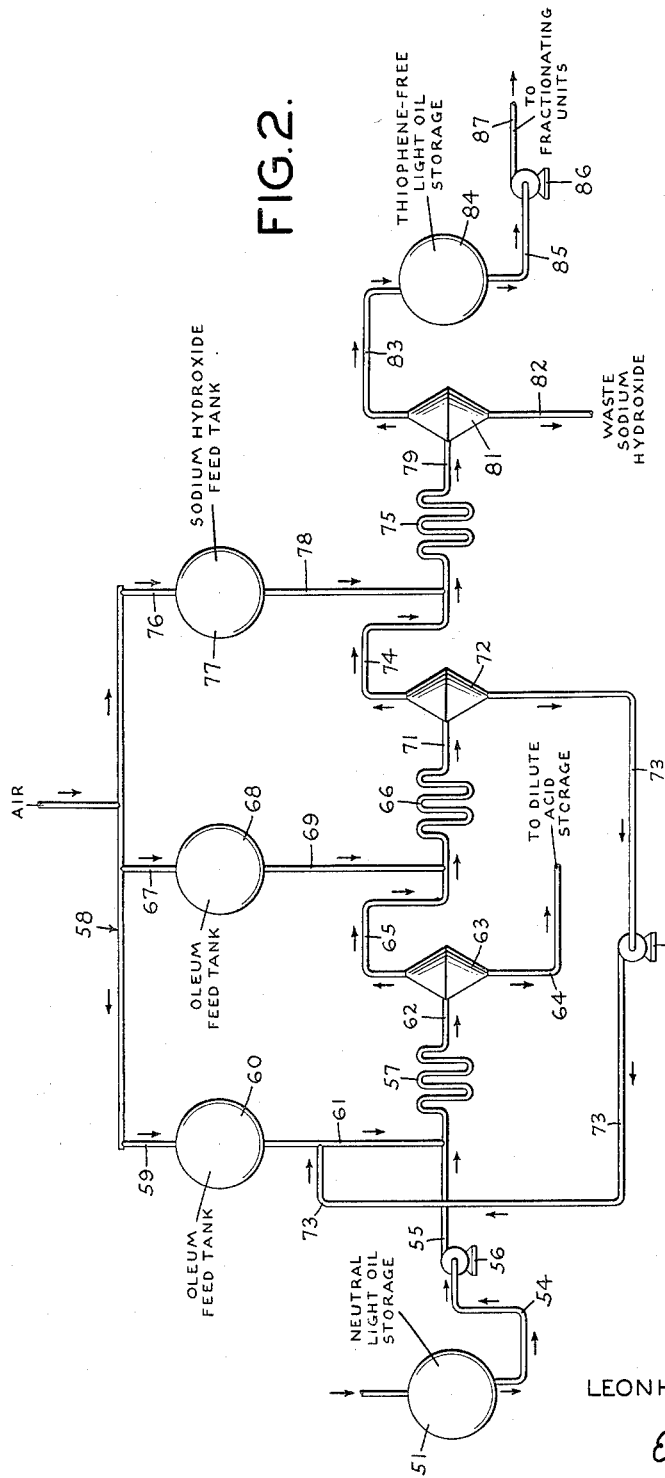

This invention relates to the chemical treatment in continuous manner of hydrocarbon distillates, and more particularly refers to a new continuous method of purifying coke oven light oil to produce relatively pure aromatic products.

Crude coke oven light oil derived as a product from the destructive distillation of coal consists principally of benzol, toluol and xylol in admixture with unsaturated hydrocarbons such as olefins and dienes, together with small amounts of phenol, nitrogen and sulfur organic compounds, including thiophene. The aromatic components, particularly benzol, derived from crude coke oven light oil must be almost entirely free from these impurities in order to meet certain rigid specifications demanded by industry.

Conventional methods of purifying crude coke oven light oil involve batch treatment with sulfuric acid to polymerize unsaturates (olefins and dienes), neutralization of the acid-treated oil with an alkali, and fractionation of the neutral oil to separate the benzol, toluol and xylol components. Probably the most common practice in the industry is to treat the crude coke oven light oil for about an hour with concentrated sulfuric acid in amount sufficient to polymerize the unsaturates and produce an acid sludge which, upon standing, settles into a separate layer and is withdrawn. The acid-treated oil is washed with an alkali solution to neutralize the oil, and the spent alkali is separated from the oil. The neutral oil is then subjected to conventional fractionation for separation into the individual aromatic components.

Although it has been extensively used, the conventional batch purification procedure has consistently been a sore spot in coke oven plants. Among the disadvantages inherent in this process are (1) disposal problem of large volumes of acid sludge, (2) loss of acid in the sludge, (3) presence of toxic fumes at the drain funnels, (4) the necessity for frequent replacement of equipment, (5) high losses of aromatic compounds in acid tar and spend alkali discharges and (6) the presence of objectionable quantities of thiophene in the fractionated oil.

In order to overcome some of the disadvantages mentioned above, an acid wash of shorter duration, e.g., about 10 minutes, followed by a water wash, has been employed. The water wash acts to dilute the acid and cause polymerized material to dissolve back into the oil. In this manner, sludge disposal has been eliminated, but the toxic fumes at the drain funnels, considerable loss of aromatics and the presence of thiophene have remained.

Recently, hydrogenation processes for the purification of crude coke oven light oil have been developed in order to reduce washing loss of the conventional acid-treating procedure. In these processes, unsaturates are recovered as saturated hydrocarbons, and organic sulfur compounds are converted into hydrogen sulfide. While several large coke plants have adopted such processes, large capital expenditure is required. Furthermore, in conversion of the unsaturates, large quantities of paraffins have been formed which must be removed by extraction procedures, resulting in losses of solvent and aromatics.

I have now developed continuous processes for the purification of crude coke oven light oil whereby exceptionally high yields of relatively pure light oil are obtained with low investment and operating costs. These processes provide for removal of acid-reactive unsaturates (olefins and dienes) and thiophene from the crude light oil. Upon simple fractionating procedure, high purity aromatics substantially free from polymeric materials and sulfur compounds, including thiophene, are obtained.

A particularly outstanding feature of my development involves provision of a continuous process for substantially complete removal of thiophene from neutralized, acid-treated light oil. Aromatics substantially free of sulfur compounds, including thiophene, are required in many applications. For example, the benzol employed for extracting camphor in the manufacture of camphor and in gum or cellulose extraction procedures must be substantially free of sulfur compounds. In batch purification operations, complete removal of thiophene from light oil has not been realized without causing substantial consumption of constituents of the light oil, particularly toluol and xylol.

Accordingly, one object of the present invention is to provide an efficient, economical, continuous process for purifying crude coke oven light oil to produce high yields of relatively pure light oil.

Another object of this invention is to provide a continuous method for purifying crude coke oven light oil whereby there is removed from the aromatic products undesired impurities prior to fractionation of the aromatic products into separate pure components.

A more specific object of the invention is to provide an efficient, economical, continuous process for removing acid-reactive unsaturates from crude coke oven light oil.

Another specific object is to provide an efficient, economical, continuous process for removing thiophene from neutral coke oven light oil (hereinafter defined).

Further objects and advantages will be apparent from the following description and drawings.

The continuous acid-treating procedure of the present invention comprises flowing a stream of crude or neutral coke oven light oil containing undesired impurities such as acid-reactive unsaturates or thiophene, under pressure, through a series of elongated, substantially unobstructed treating zones at velocity sufficient to maintain the stream in turbulent condition, introducing a stream of concentrated sulfuric acid (which may be oleum) through an orifice into the stream of oil just prior to its entry into the initial treating zone, said acid being charged at velocity about 2 to 5 times greater than the velocity of the stream of oil, at pressure greater than that of the stream of oil and in amount sufficient to convert the undesired impurities into form suitable for removal, i.e. acid-reactive unsaturates by polymerization or thiophene by extraction, passing the combined streams co-currently through said treating zone for a short contact time (usually not in excess of about one minute), preferably about 15 to 50 seconds, introducing the streams into a pressure decanting zone wherein an upper layer of oil and a lower layer of acid are formed, discharging the oil and acid from said decanting zone as separate streams, introducing a stream of aqueous alkali solution, e.g., ammonium hydroxide or sodium hydroxide solution, through an orifice into the stream of oil just prior to its entry into a second treating zone, said alkali solution being charged at velocity about 2 to 5 times greater than the velocity of the stream of oil, at pressure greater than that of the stream of oil and in amount sufficient to neutralize the acid components in the stream of oil, passing the combined streams co-currently through said second treating zone for a short contact time (usually not in excess of about one minute) preferably about 5 to 20 seconds, introducing the neutralized stream of oil into a second pressure decanting zone wherein an upper layer of neutralized oil and a lower layer of alkali solution are formed and separating the neutralized oil as product from said alkali solution.

In a preferred procedure for acid treating crude coke oven light oil containing acid-reactive unsaturates, the stream of oil, directly after treatment with concentrated sulfuric acid, is diluted with water in an amount about 2 to 3 times the volume of acid used. The water extracts most of the free acid and redissolves most of the acid polymers into the light oil, thereby minimizing the production of acid sludge. Upon settling, dilute acid separates as a lower layer and is removed. After removal of the dilute acid, the recovered oil is treated with an aqueous ammonium hydroxide solution to partially neutralize the acid components, including non-soluble acid polymers (acid tars) in the oil. Upon settling, ammonium sulfate solution, together with almost neutral polymers, separate and are removed. The polymers obtained by treatment with ammonium hydroxide solution have a low ash content and are suitable for use as fuel. The residual acidity is removed from the partially neutralized oil by treatment with aqueous alkali metal hydroxide solution.

The preferred procedure for acid treating crude coke oven light oil containing acid-reactive unsaturates is carried out in continuous manner by introducing a stream of water through an orifice into the stream of acid-treated oil flowing from the initial treating zone just prior to its entry into a second treating zone, said water being charged at velocity about 2 to 5 times greater than the velocity of the stream of oil, at pressure greater than that of the stream of oil and in amount about 2 to 3 times the volume of acid used, passing the combined streams co-currently through said second treating zone for a short reaction time (usually not in excess of about one minute), preferably about 5 to 20 seconds, introducing the diluted stream of oil into a pressure decanting zone wherein an upper layer of oil and a lower layer of dilute acid are formed, discharging the oil and acid from said decanting zone as separate streams, introducing a stream of aqueous ammonium hydroxide solution through an orifice into the oil stream just prior to its entry into a third treating zone, said ammonium hydroxide solution being charged at velocity about 2 to 5 times greater than the velocity of the stream of oil, at pressure greater than that of the stream of oil and in amount sufficient to partially neutralize acid components in the stream of oil, passing the combined streams co-currently through said third treating zone for a short contact time (usually not in excess of about one minute), preferably about 5 to 20 seconds, introducing the partially neutralized stream of oil into a second pressure decanting zone wherein an upper layer of partially neutralized oil and a lower layer of ammonium sulfate solution are formed and discharging the partially neutralized oil and ammonium sulfate solutions as separate streams. The partially neutralized oil may then be completely neutralized with aqueous alkai metal hydroxide solution as described above. Finally, in order to remove soluble polymers from the neutralized oil, the oil is subjected to steam distillation, the polymers being removed as residue of the distillation.

Neutralized, acid-treated light oil, e.g. that obtained by the above-described process, may be freed from thiophene by a continuous process which comprises steam-distilling the oil (if it has not already been steam distilled), thereby removing neutral polymers as residue, flowing the distilled oil as a stream through a series of elongated, substantially unobstructed treating zones at velocity sufficient to keep the stream in turbulent condition, introducing oleum through an orifice into the stream of oil just prior to its entry into the initial treating zone, said oleum being charged at velocity about 2 to 5 times the velocity of the stream of oil, at pressure greater than that of the stream of oil and in amount sufficient to extract the thiophene contained in the stream of oil, passing the combined streams co-currently through said initial treating zone for a short contact time (usually not in excess of about one minute), preferably about 15 to 50 seconds, introducing the streams into a pressure decanting zone wherein an upper layer of oil and a lower layer of oleum are formed, discharging the oil and oleum from said decanting zone as separate streams, introducing a stream of aqueous alkali solution, e.g., ammonium hydroxide or sodium hydroxide solution, through an orifice into the stream of oil just prior to its entry into a second treating zone, said alkali solution being charged at velocity about 2 to 5 times greater than velocity of the stream of oil, at pressure greater than that of the stream of oil and in amount sufficient to neutralize the acid components in the stream of oil, passing the combined streams co-currently through said second treating zone for a short contact time (usually not in excess of about one minute), preferably about 5 to 20 seconds, introducing the neutralized streams of oil into a second pressure decanting zone wherein an upper layer of neutral oil substantially free of thiophene and a lower layer of alkali solution are formed and separating the thiophene-free oil as product from said alkali solution.

According to a preferred procedure for removing thiophene from neutralized, acid-treated light oil, the oleum addition is carried out in two stages. Such two-stage addition of oleum has been found to require lesser amounts of oleum than a single addition step. After each of the addition stages, the oleum-treated oil is passed through a treating zone and the oil and oleum separated in a decanting zone, as described above.

In order to obtain efficient extraction of thiophene, it is essential to employ a neutralized, acid-treated coke oven light oil which has been subjected to steam distillation to remove as residue polymers which would otherwise tend to deteriorate the oleum extraction agent. The term "neutral light oil" as used herein refers to light oil of this type.

The continuous, acid-treating procedure of the present invention possesses substantial advantages over conventional batch operation. Among these advantages are (1) use of less equipment with reduced capital expense, (2) presence of less fumes at the drain funnels and (3) substantial increase in yield of light oil. In addition, higher yields of dilute acid are obtained with correspondingly less acid tars formed; less settling time is required prior to recovery of the dilute acid; and less alkali is required for neutralization of the acid-treated oil. Moreover, removal of thiophene is advantageously conducted without the substantial loss of any of the valuable components of the light oil being treated.

The accompanying drawings represent diagrammatic flow sheets illustrating specific embodiments of the present invention. FIGURE 1 illustrates the operations for removing acid-reactive unsaturates from crude coke oven light oil, and FIGURE 2 illustrates the operations for removing thiophene from neutral light oil.

Referring to FIGURE 1, a stream of crude coke oven light oil containing acid-reactive unsaturates and thiophene is continuously pumped at an inlet pressure of at least about 30 p.s.i.g., preferably about 50 to 100 p.s.i.g., from storage tank 1 through lines 2 and 3 by means of pump 4 into coiled pipe 5, which may be of any corrosion-resistant construction, e.g. stainless steel. Suitable pressure will vary depending upon the capacity of the particular plant. Although for the sake of economy of space, a coiled pipe is preferred, pipes of varied construction, including straight pipes, may be employed as long as they are of suitable size to cause the flow of oil at the design rate to be turbulent and of sufficient length to allow for the required reaction time. Generally speaking, pipes having diameters of about ⅜" to 2" and lengths of about 100' to 500' have been found suitable when the flow of liquid therethrough is at the rate of about 3 to 10 feet per second.

A stream of concentrated sulfuric acid, 66° Bé. or higher, is continuously charged from feed tank 6 through an orifice in line 7 into and transversely of the stream of light oil just prior to its entrance into pipe 5. The orifice may suitably have a diameter of about 0.02" to 0.3". Although a single orifice is satisfactory, opposing orifices, a plurality of circularly arranged orifices or other types of orifice arrangements may be employed. The orifices may be positioned at the circumference of the pipe or within the pipe itself, e.g. in the center thereof. When a single orifice is used, it is desirable to position it in the interior of the pipe. To effect completely uniform mixing of the oil and treating agent within the smallest possible fraction of a second, it is preferred that the orifice delivering the agent be disposed to effect the delivery in a direction at least partly transverse or opposed to the flow of oil. Thus, the efficient mixing characteristic of turbulent flow is aided by initial distribution of the treating agent across the stream of oil.

Ordinarily the amount of sulfuric acid employed is about 3 to 5%, based on the volume of oil charged, such amount being adequate for effecting polymerization of unsaturates in the crude coke oven light oil.

In achieving the desired results of the present invention, it is essential that the stream of coke oven light oil be passed continuously through pipe 5 at such velocity that turbulent flow occurs. Thus, as the stream of oil passes through the pipe, it is continuously subjected to the action of dispersed acid particles. The required velocity, of course, is dependent upon many factors, including the size and shape of the pipe, as well as gravitational difference between the oil and acid. For example, I have found that where the pipe has a diameter of ⅜" and comprises eight 15' lengths, the velocity of the oil stream should be at least about 3 feet per second, preferably about 4 to 10 feet per second. Higher velocities, although they may be used, are not as desirable since they produce higher pressure drops in the system.

Expressed in terms of Reynolds number, the function ordinarily used in fluid flow calculations, a value above 2100, and preferably above 3000, must be achieved to obtain turbulent flow. The Reynolds number is a function of the inside pipe diameter, the velocity of flow, the density of the liquids and the absolute viscosity.

In order to realize efficient, continuous operation, it is also necessary to permit the light oil to pass through pipe 5 for a short contact time, usually less than one minute. If, however, the contact time is less than about 5 seconds, inadequate treatment of the light oil tends to result. The contact time in a pipe of given length may be conveniently controlled by varying the velocity of the liquid flowing through the pipe.

Further, it is essential that the stream of acid be introduced through an orifice and at velocity about 2 to 5 times the velocity of the stream of oil. When maximum concentrations of acid are used, maximum velocities are necessary. Moreover, the acid must be supplied at pressure greater than that of the stream of oil, and ordinarily about 10 to 25 p.s.i.g. higher. This may be accomplished by subjecting the acid to pressure of compressed air introduced through lines 8 and 9. If these velocity and pressure conditions are not maintained, some oil remains untreated at the short contact times of the invention.

In each of the subsequent treating steps, similar velocity, pressure and contact time requirements must be employed. In each instance, the coiled pipe is of similar structure to that described above, and the treating materials are introduced through like orifices.

The combined streams of oil and acid pass continuously in turbulent condition through coiled pipe 5 for a short contact time, e.g. about 15 to 50 seconds. During this contact period the acid reacts with acid-sensitive impurities contained in the light oil and converts them into polymers, forming a sludge.

Water, under pressure of compressed air introduced through lines 8 and 11, is continuously charged from feed tank 12 through an orifice in line 13 into and transversely of the stream of acid-treated oil passing through line 14 just prior to its entry into coiled pipe 15. Ordinarily, the amount of water employed is about 2 to 3 volumes to each volume of concentrated acid. The diluted stream passes continuously in turbulent condition through pipe 15 for a short contact time, e.g. about 5 to 20 seconds. During this time, dilution of the acid causes most of the reacted impurities to dissolve back into the light oil.

The stream exiting pipe 15 continuously flows through line 16 and enters a pressure-type decanter 17 wherein dilute acid separates as a lower layer and oil as an upper layer. The dilute acid continuously discharges from decanter 17 through line 18 and passes to dilute acid storage tank 19 for further use, e.g. in the sulfate plant of coke oven operations. The extent of recovery of the acid is generally at least about 95%.

The stream of oil substantially free from dilute acid flows continuously from the top of decanter 17 through line 21 to coiled pipe 22. A sample taken from line 21 should have a color (A.S.T.M. test #D848–47) no higher than 1, preferably 0 or 0+. Aqueous ammonium hydroxide solution, under pressure of compressed air supplied through lines 8 and 23, is continuously charged from feed tank 24 through an orifice in line 25 into and transversely of the stream of oil just prior to its entry into coiled pipe 22. The amount of ammonium hydroxide solution employed is usually about 0.5 to 1.5% of the light oil stream. The combined streams of oil and ammonium hydroxide solution pass continuously in turbulent condition through pipe 22 for a short contact time, e.g. about 5 to 20 seconds. Turbulent mixing in pipe 22 results in partial neutralization of the oil. The liquids then flow continuously through line 26 to pressure-type decanter 27 wherein ammonium sulfate solution separates as a bottom layer, insoluble polymers (acid tars) as a middle layer and oil as a top layer. The bottom and middle layers flow continuously through line 28 to pressure-type decanter 29 wherein the polymers separate as an upper layer and ammonium sulfate solution as a lower layer. The ammonium sulfate solution discharges continuously through line 31 and flows via line 18 to dilute acid storage tank 19. The ammonia value of the ammonium sulfate may subsequently be recovered by conventional operation. The polymers flow continuously through line 32 and are combined with neutral polymers subsequently obtained.

The oil layer at the top of decanter 27 flows continuously through line 33 to coiled pipe 34. Sodium hydroxide solution, under pressure of compressed air introduced through lines 8 and 35, is passed continuously from feed tank 36 through an orifice in line 37 into and transversely of the stream of oil just prior to its entry into pipe 34. The amount of sodium hydroxide solution employed is that sufficient to effect substantially complete neutralization of the oil, and, generally speaking, constitutes about 0.5 to 1.5% of the light oil stream. The combined oil and sodium hydroxide solution streams pass through pipe 34 for a short contact time, e.g. about 10 to 20 seconds, during which time the turbulent mixing results in complete neutralization of the oil. The treated material then flows continuously through line 38 into pressure-type decanter 39 wherein spent sodium hydroxide solution separates as a lower layer from the oil and flows via line 41 to disposal.

The washed neutral oil flows continuously from the top of decanter 39 through line 42 and is introduced into steam still 43, which may be any suitable column equipped with bubble cap plates. Steam is directed through line 44 into the bottom of still 43, passing upwardly through the column in direct contact with the oil introduced therein through line 42 and causing the lighter oils, i.e. benzol, toluol and xylol, to become vaporized and to separate from the impurities and higher boiling constituents (polymers) in the light oil. The oil in still 43 is maintained at a temperature below 250° F.

The steam vaporization may conveniently be carried out at atmospheric pressure but, if desired, sub-atmospheric pressure may be employed.

The benzol, toluol and xylol vapors, together with water vapor, are continuously evolved from the top of the still through line 45, cooled and condensed in condenser 46, and then sent through line 47 into pressure-type decanter 48 wherein the condensate separates into an upper layer of light oil which flows through line 49 to storage tank 51, and a lower water layer which discharges through line 52. The light oil sent to tank 51 is substantially free of polymeric materials and usually contains about 100 to 200 p.p.m. thiophene. The oil is generally obtained in yield of at least about 93.5%.

The residue of still 43, consisting principally of neutral polymers (gums) is withdrawn through line 53 where it is combined with polymers which were removed from decanter 29 via line 32. Total yield of polymers is generally at least about 5%. These polymers are low ash materials suitable for use as fuel.

Referring to FIGURE 2, neutral light oil is continuously pumped at an inlet pressure of at least about 25 p.s.i.g., preferably about 40 to 80 p.s.i.g., from storage tank 51 through lines 54 and 55 by means of pump 56 into coiled pipe 57. A stream of oleum, e.g. 20 to 40% oleum, under pressure of compressed air introduced through lines 58 and 59, is continuously charged from feed tank 60 through an orifice in line 61 into and transversely of the stream of oil just prior to its entry into pipe 57. The amount of oleum generally charged represents about 2.0 to 4.0% of the oil stream. The combined liquids pass continuously through the pipe for a short contact time, e.g. about 15 to 50 seconds, during which time the oleum extracts a substantial part of the thiophene content of the light oil. The liquids then flow continuously through line 62 into pressure-type decanter 63 wherein oleum separates out as a lower layer and oil as an upper layer. The oleum flows through line 64 and may be combined with the dilute acid in storage tank 19 of FIGURE 1.

The light oil flows continuously from the top of decanter 63 through line 65 into coiled pipe 66. Additional oleum, under pressure of compressed air introduced through lines 58 and 67, is passed continuously from feed tank 68 through an orifice in line 69 into and transversely of the stream of oil just prior to its entry into pipe 66. The additional amount of oleum used should be sufficient to extract all of the remaining thiophene from the light oil and generally constitutes about 1.5 to 3.0% of the light oil stream. The liquids flow continuously through pipe 66 for a short contact time, e.g. about 15 to 50 seconds, thereby removing the remainder of the thiophene from the light oil. The material then passes continuously via line 71 to pressure-type decanter 72 wherein oleum separates as a bottom layer and thiophene-free light oil as an upper layer. The oleum discharges through line 73 and is continuously pumped by means of pump 70 to line 61 to serve as oleum charge for the first oleum step of the process.

The thiophene-free light oil passes continuously from decanter 72 through line 74 to coiled pipe 75. Sodium hydroxide solution, under pressure of compressed air introduced through lines 58 and 76, is introduced continuously from feed tank 77 through an orifice in line 78 into and transversely of the steam oil just prior to its entry into pipe 75. The amount of sodium hydroxide solution employed is that adequate to effect neutralization of acid components present in the light oil, and generally constitutes about 1.0 to 1.5% of the oil stream. The combined liquids pass continuously through pipe 75 for a short contact time, e.g. about 10 to 20 seconds. The neutralized oil then passes continuously through line 79 to pressure-type decanter 81 wherein sodium hydroxide solution separates as a lower layer and neutral oil as an upper layer. The sodium hydroxide solution discharges continuously from the system via line 82 as waste material. The thiophene-free light oil flows continuously from the top of decanter 81 and passes through line 83 to storage tank 84. This oil may then be continuously withdrawn through line 85 and directed by pump 86 through line 87 to conventional fractionating units, wherein it is separated into individual components, namely, benzol, toluol and xylol. The purified light oil is substantially free of polymeric materials and thiophene (<1 p.p.m.) and is generally obtained in yield of at least about 92.5% (based on the initial crude oil charge).

Suitable flowmeters and valves (not shown) may be installed in FIGURES 1 and 2 in manner well known to those skilled in the art.

It should be understood that variations in ratio of chemicals, stream velocities and contact times may be necessary when treating coke oven light oil of varying character.

The following example is a typical illustration of the manner in which my invention is performed. In the example, each coiled pipe has a diameter of ⅜″ and is composed of eight 15″ lengths, and each orifice has a diameter of 0.03″. Parts are by volume.

1000 parts per minute of crude coke oven light oil, containing about 2.5% acid-reactive unsaturates and about 0.05% thiophene, are continuously pumped into coiled pipe 5 at velocity of about 4 feet per second and at inlet pressure of about 100 p.s.i.g. The crude coke oven light oil charge has the following analysis (Engler distillation):

| | |
|---|---|
| 76° C | First drop |
| 80° C | percent 5.0 |
| 100° C | do 86.0 |
| 110° C | do 91.0 |
| 120° C | do 93.0 |
| 130° C | do 95.0 |
| 140° C | do 97.0 |
| 147° C | Decomposition |

40 parts per minute of 66° Bé. sulfuric acid are continuously introduced through an orifice into and transversely of the stream of oil at velocity of about 16 feet per second and at pressure of about 120 p.s.i.g. just prior to entry of the oil into pipe 5. The combined streams flow in turbulent condition through the pipe for a contact time of about 30 seconds. 100 parts per minute of water are continuously introduced into and transversely of the stream (pressure of stream—about 60 p.s.i.g.) exiting pipe 5 at velocity of about 16 feet per second and at pressure of about 80 p.s.i.g. just prior to entry of the oil into coiled pipe 15. The diluted stream flows through pipe 15 for a contact time of about 15 seconds, and then flows to decanter 17 wherein a lower layer of dilute acid and an upper layer of oil form. The dilute acid discharges from the system.

The upper oil layer is passed to coil pipe 22. 10 parts per minute of aqueous ammonium hydroxide solution (20%) are continuously introduced into and transversely of the oil stream (pressure of stream—about 40 p.s.i.g.) at velocity of about 16 feet per second and at pressure of about 60 p.s.i.g. just prior to entry of the oil into coiled pipe 22. The partially neutralized oil flows through pipe 22 for a contact time of about 15 seconds and then enters decanter 27. In decanter 27, ammonium sulfate solution separates as a bottom layer, insoluble polymers as a middle layer and oil as a top layer. The middle and bottom layers discharge to decanter 29 for separation of the polymers and ammonium sulfate solution. The ammonium sulfate solution is combined with the dilute acid previously removed. The total acid recovered is about 95%.

The oil layer at the top of decanter 27 flows to coiled pipe 34. 10 parts per minute of aqueous sodium hydroxide solution (10%) are continuously introduced into and transversely of the stream of oil (pressure of stream—about 20 p.s.i.g.) at velocity of about 16 feet per second and at pressure of about 40 p.s.i.g. just prior to entry of the oil into coiled pipe 34. The combined streams pass through pipe 34 for a contact time of about 15 seconds, during which time the oil is completely neutralized. The neutralized oil then flows into decanter 39 wherein spent sodium hydroxide solution separates as a lower layer from the oil and discharges from the system.

The neutralized oil from the top of decanter 39 is fed continuously to an intermediate point in still 43, and at the same time direct steam is admitted to the bottom of the still, thereby vaporizing the lighter oils, i.e. benzol, toluol and xylol, and leaving principally neutral polymers as residue. The polymers are combined with the polymers recovered from decanter 29. Total yield of polymers is about 6%.

The benzol, toluol and xylol vapors are condensed in condenser 46 and then sent to decanter 48 wherein the condensate separates into an upper layer of neutral light oil and a lower water layer which is discharged. The neutral oil, obtained in yield of 93.5% is substantially free of polymeric materials and contains about 150 p.p.m. thiophene.

The neutral oil is pumped into coiled pipe 57 at velocity of about 4 feet per second and at inlet pressure of about 80 p.s.i.g. 25 parts per minute of oleum (26%) are continuously charged through an orifice into and transversely of the stream of oil at velocity of about 16 feet per second and at pressure of about 100 p.s.i.g. just prior to entry of the oil into pipe 57. The combined streams pass through the pipe for a contact time of about 30 seconds, during which time the oleum extracts a substantial part of the thiophene content of the oil. The liquids then flow into decanter 63 wherein oleum separates out as a lower layer and oil as an upper layer.

The oil flows from the top of decanter 63 into coiled pipe 66. 20 parts per minute of oleum (26%) are continuously introduced through an orifice into and transversely of the stream of oil (pressure of stream—about 50 p.s.i.g.) at velocity of about 16 feet per second and at pressure of about 70 p.s.i.g. just prior to entry of the oil into pipe 66. The oleum extracts the remaining thiophene from the oil. The stream flows through pipe 66 for a contact time of about 30 seconds and then passes to decanter 72 wherein oleum separates as a bottom layer and thiophene-free light oil as an upper layer. The oleum is subsequently used in treating additional oil in the first oleum addition step.

The thiophene-free light oil passes from decanter 72 to coiled pipe 75. 15 parts per minute of aqueous sodium hydroxide solution (10%) are continuously introduced through an orifice into and transversely of the stream of oil (pressure of stream—about 20 p.s.i.g.) at velocity of about 16 feet per second and at pressure of about 40 p.s.i.g. just prior to entry of the oil into pipe 75. The combined streams pass through pipe 75 for a contact time of about 15 seconds, during which time the oil is completely neutralized. The oil then flows to decanter 81 wherein sodium hydroxide solution separates as a lower layer and neutral oil as an upper layer. The neutral oil discharges as product in 92.5% yield (based on the crude oil charge). The product is substantially free of polymeric materials and thiophene (<1 p.p.m.).

Although certain preferred embodiments of the invention have been disclosed for purpose of illustration, it will be evident that various changes may be made therein without departing from the scope and spirit of the invention.

I claim:

1. A continuous process for acid-treating coke oven light oil containing undesired impurities which comprises continuously flowing a stream of the oil, under pressure, through a series of elongated, substantially unobstructed treating zones at velocity of at least about 3 feet per second whereby the stream is maintained in turbulent condition, continuously introducing a stream of concentrated sulfuric acid through an orifice into the stream of oil just prior to its entry into the initial treating zone, said acid being charged at velocity about 2 to 5 times greater than the velocity of the stream of oil, at pressure greater than that of the stream of oil and in amount sufficient to convert the undesired impurities into form suitable for removal, continuously passing the combined streams of oil and acid co-currently through said initial treating zone for a contact time of about 5 seconds to about 1 minute, continuously introducing the acid-treated stream into a pressure decanting zone wherein an upper layer of oil and a lower layer of acid are formed, continuously discharging the oil and acid from said decanting zone as separate streams, continuously introducing a stream of aqueous alkali solution through an orifice into the stream of oil just prior to its entry into a second treating zone, said alkali solution being charged at velocity about 2 to 5 times greater than the velocity of the stream of oil, at pressure greater than that of the stream of oil and in amount sufficient to neutralize the acid components in the stream of oil, continuously passing the combined streams of oil and alkali solution co-currently through said second treating zone for a contact time of about 5 seconds to about 1 minute, continuously introducing the neutralized stream of oil into a second pressure decanting zone wherein an upper layer of neutralized oil and a lower layer of alkali solution are formed and continuously separating the neutralized oil as product from said alkali solution.

2. A continuous process for removing acid-reactive unsaturates from crude coke oven light oil which comprises continuously flowing a stream of oil, under pressure, through a series of elongated, substantially unobstructed treating zones at velocity of at least about 3 feet per second whereby the stream is maintained in turbulent condition, continuously introducing a stream of concentrated sulfuric acid through an orifice into the stream of oil just prior to its entry into the initial treating zone, said acid being charged at velocity about 2 to 5 times greater than the velocity of the stream of oil, at pressure greater than that of the stream of oil and in amount sufficient to polymerize acid-reactive unsaturates in the stream of oil, continuously passing the combined streams of oil and acid co-currently through said initial treating zone for a contact time of about 15 seconds to about 1 minute, continuously introducing a stream of water through an orifice into the stream of acid-treated oil just prior to its entry into a second treating zone, said water being charged at velocity about 2 to 5 times greater than the velocity of the stream of oil, at pressure greater than that of the stream of oil and in amount about 2 to 3 times the volume of acid used, continuously passing the combined streams of oil and water co-currently through said second treating zone for a contact time of about 5 seconds to about 1 minute, continuously introducing the diluted stream of oil into a pressure decanting zone wherein an upper layer of oil and a lower layer of dilute acid are formed, continuously discharging the oil and dilute acid from said decanting zone as separate streams, continuously introducing a stream of aqueous ammonium hydroxide solution through an orifice into the stream of oil just prior to its entry into a third treating zone, said ammonium hydroxide solution being charged at velocity about 2 to 5 times greater than the velocity of the stream of oil, at pressure greater than that of the stream of oil and in amount sufficient to partially neutralize the acid components in the stream of oil, continuously passing the combined streams of oil and ammonium hydroxide solution co-currently through said third treating zone for a contact time of about 5 seconds to about 1 minute, continuously introducing the partially neutralized stream of oil into a second pressure decanting zone wherein an upper layer of partially neutralized oil and a lower layer of ammonium sulfate solution are formed, continuously discharging the partially neutralized oil and ammonium sulfate solution as separate streams, continuously introducing a stream of aqueous alkali metal hydroxide solution through an orifice into the oil stream just prior to its entry into a fourth treating zone, said alkali metal hydroxide solution being charged at velocity about 2 to 5 times greater than the velocity of the stream of oil, at pressure greater than that of the stream of oil and in amount sufficient to completely neutralize the acid components in the stream of oil, continuously passing the combined streams of oil and alkali metal hydroxide solution co-currently through said fourth treating zone for a contact time of about 5 seconds to about 1 minute, continuously introducing the completely neutralized stream of oil into a third pressure decanting zone wherein an upper layer of neutralized oil and a lower layer of alkali metal hydroxide solution are formed, continuously discharging the neutralized oil and alkali metal hydroxide solution from said third decanting zone as separate streams and continuously steam distilling said stream of neutralized oil to vaporize from the oil aromatic compounds substantially free of polymeric materials.

3. A continuous process for removing thiophene from neutralized, acid-treated crude coke oven light oil which comprises continuously steam distilling the oil to vaporize therefrom aromatic compounds substantially free of polymeric materials, continuously flowing a stream of the distilled oil, under pressure, through a series of elongated, substantially unobstructed treating zones at velocity of at least about 3 feet per second whereby the stream is maintained in turbulent condition, continuously introducing a stream of oleum through an orifice into the stream of oil just prior to its entry into the initial treating zone, said oleum being charged at velocity about 2 to 5 times the velocity of the stream of oil, at pressure greater than that of the stream of oil and in amount sufficient to extract the thiophene contained in the stream of oil, continuously passing the combined streams of oil and oleum co-currently through said initial treating zone for a contact time of about 15 seconds to about 1 minute, continuously introducing the combined streams into a pressure decanting zone wherein an upper layer of oil and a lower layer of oleum are formed, continuously discharging the oil and oleum from said decanting zone as separate streams, continuously introducing a stream of aqueous alkali solution through an orifice into the stream of oil just prior to its entry into a second treating zone, said alkali solution being charged at velocity about 2 to 5 times greater than the velocity of the stream of oil, at pressure greater than that of the stream of oil and in amount sufficient to neutralize the acid components in the stream of oil, continuously passing the combined streams of oil and alkali solution co-currently through said second treating zone for a contact time of about 5 seconds to about 1 minute, continuously introducing the neutralized stream of oil into a second pressure decanting zone wherein an upper layer of neutral oil substantially free of thiophene and a lower layer of alkali solution are formed and continuously separating the thiophene-free oil as product from said alkali solution.

4. A continuous process for removing thiophene from neutralized, acid-treated crude coke oven light oil which comprises continuously steam distilling the oil to vaporize therefrom aromatic compounds substantially free of polymeric materials, continuously flowing a stream of the distilled oil, under pressure, through a series of elongated, substantially unobstructed treating zones at velocity of at least about 3 feet per second whereby the stream is maintained in turbulent condition, continuously introducing a stream of oleum through an orifice into the stream of oil just prior to its entry into the initial treating zone, said oleum being charged at velocity about 2 to 5 times the velocity of the stream of oil, at pressure greater than that of the stream of oil and in amount sufficient to extract part of the thiophene contained in the stream of oil, continuously passing the combined streams of oil and oleum co-currently through said initial treating zone for a contact time of about 15 seconds to about 1 minute, continuously introducing the combined streams into a pressure decanting zone wherein an upper layer of oil and a lower layer of oleum are formed, continuously discharging the oil and oleum from said decanting zone as separate streams, continuously introducing a second stream of oleum through an orifice into the stream of oil just prior to its entry into a second treating zone, said oleum being charged at velocity about 2 to 5 times the velocity of the stream of oil, at pressure greater than that of the stream of oil and in amount sufficient to extract the remaining thiophene contained in the stream of oil, continuously passing the combined streams of oil and oleum co-currently through said second treating zone for a contact time of about 15 seconds to about 1 minute, continuously introducing the combined streams into a second pressure decanting zone wherein an upper layer of oil and a lower layer of oleum are formed, discharging the oil and oleum from said second decanting zone as separate streams, continuously introducing a stream of aqueous alkali solution through an orifice into the stream of oil just prior to its entry into a third treating zone, said alkali solution being charged at velocity about 2 to 5 times greater than the velocity of the stream of oil, at pressure greater than that of the stream of oil and in amount sufficient to neutralize the acid components in the stream of oil, continuously passing the combined streams of oil and alkali solution co-currently through said third treating zone for a contact time of about 5 seconds to about 1 minute, continuously introducing the neutralized stream of oil into a third pressure decanting zone wherein an upper layer of neutral oil substantially free of thiophene and a lower layer of alkali solution are formed and continuously separating the thiophene-free oil as product from said alkali solution.

5. A continuous process for purifying crude coke oven light oil which comprises continuously flowing a stream of the oil, under pressure, through a series of elongated, substantially unobstructed treating zones at velocity of at least about 3 feet per second whereby the stream is maintained in turbulent condition, continuously introducing a stream of concentrated sulfuric acid through an orifice into the stream of oil just prior to its entry into the initial treating zone, said acid being charged at velocity about 2 to 5 times greater than the velocity of the stream of oil, at pressure greater than that of the stream of oil and in amount sufficient to polymerize acid-reactive unsaturates in the stream of oil, continuously passing the combined streams of oil and acid co-currently through said initial treating zone for a contact time of about 15 seconds to about one minute, continuously introducing the acid-treated stream into a pressure decanting zone wherein an upper layer of oil and a lower layer of acid are formed, continuously discharging the oil and acid from said decanting zone as separate streams, continuously introducing a stream of aqueous alkali solution through an orifice into the stream of oil just prior to its entry into a second treating zone, said alkali solution being charged at velocity about 2 to 5 times greater than the velocity of the stream of oil, at pressure greater than that of the stream of oil and in amount sufficient to neutralize the acid components in the stream of oil, continuously passing the combined streams of oil and alkali solution co-currently through said second treating zone for a contact time of about 5 seconds to about one minute, continuously introducing the neutralized stream of oil into a second pressure decanting zone wherein an upper layer of neutralized oil and a lower layer of alkali solution are formed, continuously discharging the neutralized oil and alkali solution from said second decanting zone as separate streams, continuously steam distilling the stream of neutralized oil to vaporize therefrom aromatic compounds substantially free of polymeric materials, continuously introducing a stream of oleum through an orifice into the stream of oil just prior to its entry into a third treating zone, said oleum being charged at velocity about 2 to 5 times the velocity of the stream of oil, at pressure greater than that of the stream of oil and in amount sufficient to extract the thiophene contained in the stream of oil, continuously passing the combined streams of oil and oleum co-currently through said third treating zone for a contact time of about 15 seconds to about one minute, continuously introducing the combined streams into a third pressure decanting zone wherein an upper layer of oil and a lower layer of oleum are formed, continuously discharging the oil and oleum from said third decanting zone as separate streams, continuously introducing a stream of aqueous alkali solution through an orifice into the stream of oil just prior to its entry into a fourth treating zone, said alkali solution being charged at velocity about 2 to 5 times greater than the velocity of the stream of oil, at pressure greater than that of the stream of oil and in amount sufficient to neutralize the acid components in the stream of oil, continuously passing the combined streams of oil and alkali solution co-currently through said fourth treating zone for a contact time of about 5 seconds to about one minute, continuously introducing the neutralized stream of oil into a fourth pressure decanting zone wherein an upper layer of neutral oil substantially free of thiophene and a lower layer of alkali solution are formed and continuously separating the thiophene-free oil as product from said alkali solution.

6. A continuous process for purifying crude coke oven light oil which comprises continuously flowing a stream of oil, under pressure, through a series of elongated, substantially unobstructed treating zones at velocity of about 3 to 10 feet per second whereby the stream is maintained in turbulent condition, continuously introducing a stream of concentrated sulfuric acid through an orifice into and transversely of the stream of oil just prior to its entry into the initial treating zone, said acid being charged at velocity about 2 to 5 times greater than the velocity of the stream of oil, at pressure greater than that of the stream of oil and in amount sufficient to polymerize acid-reactive unsaturates in the stream of oil, continuously passing the combined streams of oil and acid co-currently through said initial treating zone for a contact time of about 15 to 50 seconds, continuously introducing a stream of water through an orifice into and transversely of the stream of acid-treated oil just prior to its entry into a second treating zone, said water being charged at velocity about 2 to 5 times greater than the velocity of the stream of oil, at pressure greater than that of the stream of oil and in amount about 2 to 3 times the volume of acid used, continuously passing the combined streams of oil and water co-currently through said second treating zone for a contact time of about 5 to 20 seconds, continuously introducing the diluted stream of oil into a pressure decanting zone wherein an upper layer of oil and a lower layer of dilute acid are formed, continuously discharging the oil and dilute acid from said decanting zone as separate streams, continuously introducing a stream of aqueous ammonium hydroxide solution through an orifice into and transversely of the stream of oil just prior to its entry into a third treating zone, said ammonium hydroxide solution being charged at velocity about 2 to 5 times greater than the velocity of the stream of oil, at pressure greater than that of the stream of oil and in amount sufficient to partially neutralize the acid components in the stream of oil, continuously passing the combined streams of oil and ammonium hydroxide solution co-currently through said third treating zone for a contact time of about 5 to 20 seconds, continuously introducing the partially neutralized stream of oil into a second pressure decanting zone wherein an upper layer of partially neutralized oil and a lower layer of ammonium sulfate solution are formed, continuously discharging the partially neutralized oil and ammonium sulfate solution as separate streams, continuously introducing a stream of aqueous alkali metal hydroxide solution through an orifice into and transversely of the oil stream just prior to its entry into a fourth treating zone, said alkali metal hydroxide solution being charged at velocity about 2 to 5 times greater than the velocity of the stream of oil, at pressure greater than that of the stream of oil and in amount sufficient to completely neutralize the acid components in the stream of oil, continuously passing the combined streams of oil and alkali metal hydroxide solution co-currently through said fourth treating zone for a contact time of about 5 to 20 seconds, continuously introducing the completely neutralized stream of oil into a third pressure decanting zone wherein an upper layer of neutralized oil and a lower layer of alkali metal hydroxide solution are formed, continuously discharging the neutralized oil and alkali metal hydroxide solution from said third decanting zone as separate streams, continuously steam distilling said stream of neutralized oil to vaporize from the oil aromatic compounds substantially free of polymeric materials, continuously introducing a stream of oleum through an orifice into and transversely of a stream of the distilled oil just prior to its entry into a fifth treating zone, said oleum being charged at velocity about 2 to 5 times the velocity of the stream of oil, at pressure greater than that of the stream of oil and in amount sufficient to extract part of the thiophene contained in the stream of oil, continuously passing the combined streams of oil and oleum co-currently through said fifth treating zone for a contact time of about 15 to 50 seconds, continuously introducing the combined streams into a fourth pressure decanting zone wherein an upper layer of oil and a lower layer of oleum are formed, discharging the oil and oleum from said decanting zone as separate streams, continuously introducing a second stream of oleum through an orifice into and transversely of the stream of oil just prior to its entry into a sixth treating zone, said oleum being charged at velocity about 2 to 5 times the velocity of the stream of oil, at pressure greater than that of the stream of oil and in amount sufficient to extract the remaining thiophene contained in the stream of oil, continuously passing the combined streams of oil and oleum co-currently through said sixth treating zone for a contact time of about 15 to 50 seconds, continuously introducing the combined streams into a fifth pressure decanting zone wherein an upper layer of oil and a lower layer of oleum are formed, continuously discharging the oil and oleum from said fifth decanting zone as separate streams, introducing a stream of aqueous alkali solution through an orifice into and transversely of the stream of oil just prior to its entry into a seventh treating zone, said alkali solution being charged at velocity about 2 to 5 times greater than the velocity of the stream of oil, at pressure greater than that of the stream of oil and in amount sufficient to neutralize the acid components in the stream of oil, continuously passing the combined streams of oil and alkali solution co-currently through said seventh treating zone for a contact time of about 5 to 20 seconds, continuously introducing the neutralized stream of oil into a sixth pressure decanting zone wherein an upper layer of neutral oil substantially free of thiophene and a lower layer of alkali solution are formed and continuously separating the thiophene-free oil as product from said alkali solution.

7. A continuous process for removing acid-reactive unsaturates from crude coke oven light oil which comprises continuously flowing a stream of the oil, under pressure, through a series of elongated, substantially unobstructed treating zones at velocity of at least about 3 feet per second whereby the stream is maintained in turbulent condition, continuously introducing a stream of concentrated sulfuric acid through an orifice into the stream of oil just prior to its entry into the initial treating zone, said acid being charged at velocity about 2 to 5 times greater than the velocity of the stream of oil, at pressure greater than that of the stream of oil and in amount sufficient to polymerize acid-reactive unsaturates in the stream of oil, continuously passing the combined streams of oil and acid co-currently through said initial treating zone for a contact time of about 15 seconds to about 1 minute, continuously introducing the acid-treated stream into a pressure decanting zone wherein an upper layer of oil and a lower layer of acid are formed, continuously discharging the oil and acid from said decanting zone as separate streams, continuously introducing a stream of aqueous ammonium hydroxide solution through an orifice into the stream of oil just prior to its entry into a second treating zone, said ammonium hydroxide solution being charged at velocity about 2 to 5 times greater than the velocity of the stream of oil, at pressure greater than that of the stream of oil and in amount sufficient ot neutralize the acid components in the stream of oil, continuously passing the combined streams of oil and ammonium hydroxide solution co-currently through said second treating zone for a contact time of about 5 seconds to about 1 minute, continuously introducing the neutralized stream of oil into a second pressure decanting zone wherein an upper layer of neutralized oil and a lower layer of ammonium hydroxide solution are formed and continuously separating the neutralized oil as product from said ammonium hydroxide solution.

References Cited in the file of this patent

UNITED STATES PATENTS

| | | |
|---|---|---|
| 1,678,225 | Kincade | July 24, 1928 |
| 1,704,206 | Olsen | Mar. 5, 1929 |
| 2,312,112 | McNealy | Feb. 23, 1943 |
| 2,332,793 | Hermann | Oct. 26, 1943 |
| 2,337,826 | Lee | Dec. 28, 1943 |
| 2,357,266 | Malcolm | Aug. 29, 1944 |
| 2,862,983 | Nord | Dec. 2, 1958 |